US010264217B2

(12) United States Patent
Pepperell et al.

(10) Patent No.: US 10,264,217 B2
(45) Date of Patent: Apr. 16, 2019

(54) OPTIMISING CALL HANDLING IN A MULTI-NODE CONFERENCING INFRASTRUCTURE

(71) Applicant: Cisco Technology, Inc., San Jose, CA (US)

(72) Inventors: Andy Pepperell, Middlesex (GB); Malcolm Walters, Abingdon (GB); Robert Welin, Heathcroft (GB)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/845,207

(22) Filed: Dec. 18, 2017

(65) Prior Publication Data

US 2018/0176510 A1    Jun. 21, 2018

(30) Foreign Application Priority Data

Dec. 19, 2016  (GB) .................................. 1621655.8

(51) Int. Cl.
| | |
|---|---|
| *H04N 7/15* | (2006.01) |
| *H04L 12/18* | (2006.01) |
| *H04M 3/54* | (2006.01) |
| *H04L 29/06* | (2006.01) |
| *H04M 3/56* | (2006.01) |

(52) U.S. Cl.
CPC ......... *H04N 7/152* (2013.01); *H04L 12/1818* (2013.01); *H04L 65/1069* (2013.01); *H04L 65/403* (2013.01); *H04M 3/54* (2013.01); *H04M 3/567* (2013.01); *H04M 2203/5009* (2013.01)

(58) Field of Classification Search
CPC . H04N 7/152; H04L 65/1069; H04L 12/1818; H04L 65/403; H04M 3/567; H04M 3/54
See application file for complete search history.

(56) References Cited

U.S. PATENT DOCUMENTS

2008/0201414 A1*  8/2008  Amir Husain .......... G06F 9/445
                                                          709/203
2011/0069642 A1*  3/2011  Karam ................ H04L 65/1046
                                                          370/260

(Continued)

OTHER PUBLICATIONS

Combined Search and Examination Report in counterpart United Kingdom Application No. GB1621655.8, dated May 30, 2017, 6 pages.

(Continued)

*Primary Examiner* — Stella L. Woo

(57) ABSTRACT

A method for adding a call from a second client to a videoconference; wherein a call from at least a first client is connected to the videoconference, the call from the first client comprising first call control data and first call media data; wherein the call from the second client comprises second call control data and second call media data; and wherein a first node in a videoconferencing network handles the first call media data; the method comprising: handling the second call control data at a second node of the videoconferencing network; determining whether at least one criterion is satisfied; and in the event that at least one criterion is satisfied, diverting the second call media data to the first node of the videoconferencing network.

20 Claims, 10 Drawing Sheets

(56) References Cited

U.S. PATENT DOCUMENTS

2013/0162756 A1* 6/2013 Ellison ................ H04L 65/403
                                                    348/14.08
2014/0267571 A1* 9/2014 Periyannan ............ H04N 7/15
                                                    348/14.08
2016/0080695 A1    3/2016 Nocchi et al.

OTHER PUBLICATIONS

Cisco, "Cisco Telepresence MCU 45X0, 53X0 and MCU MSE 8510," Cisco Telepresence Deployment Guide, May 2012, 32 pages.

* cited by examiner

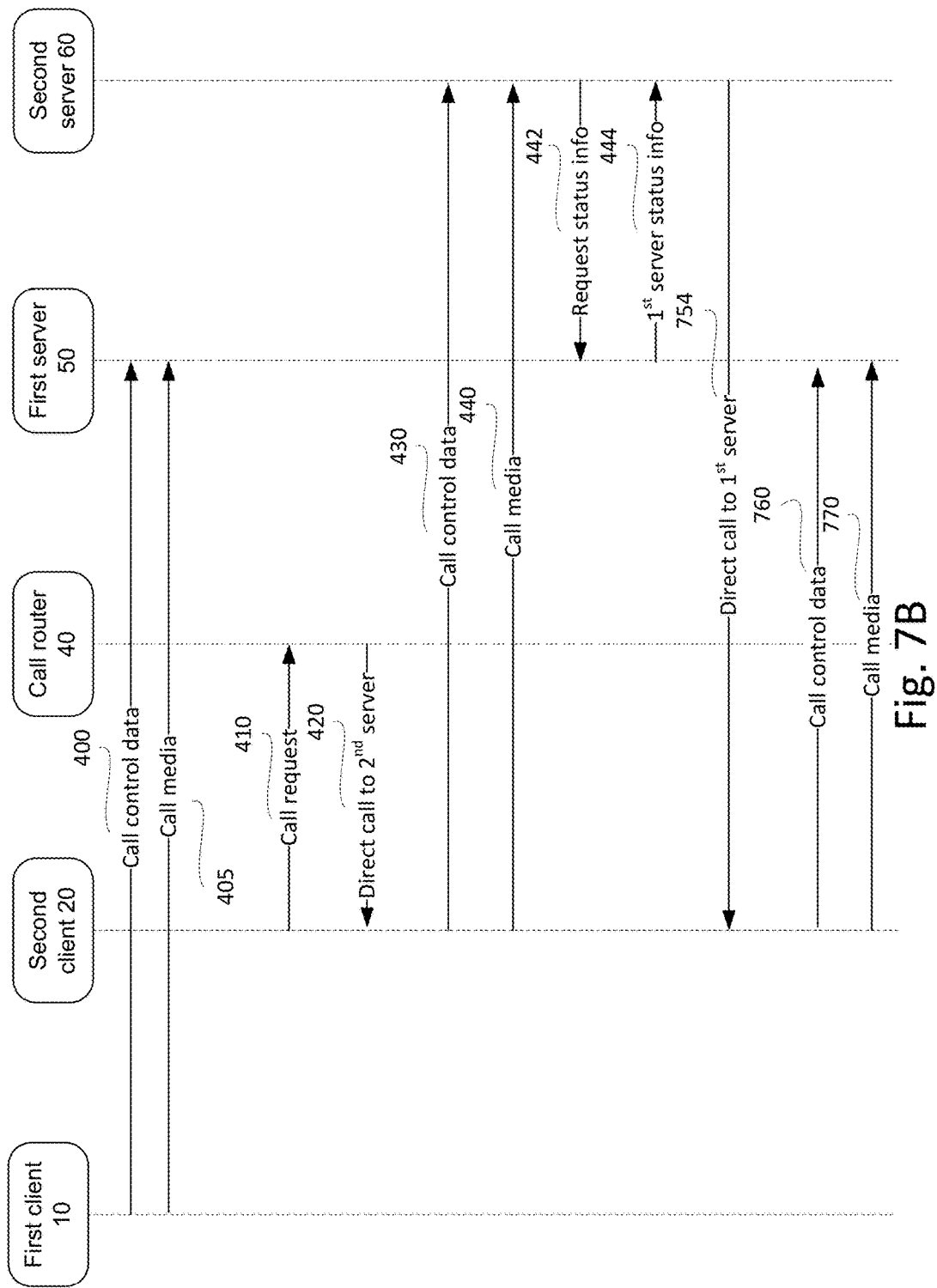

OPTIMISING CALL HANDLING IN A MULTI-NODE CONFERENCING INFRASTRUCTURE

PRIORITY CLAIM

This application claims priority to Great Britain Application No. 1621655.8, filed Dec. 19, 2016, the entirety of which is incorporated herein by reference.

TECHNICAL FIELD

The present disclosure relates to data handling in networks. More particularly, the present disclosure relates to call media handling in videoconferencing systems.

BACKGROUND

In videoconferencing systems, multiple videoconferencing servers may be used to host videoconferences. For example, for efficiency reasons a large capacity conferencing infrastructure might be split across multiple separate units or servers. The total capacity needed at any given time across multiple active conferences might exceed that of an individual box, or it might be that it is necessary for the hosting organisation to be able to take different units out of service (for instance for software upgrades) without ending the service completely.

When a new participant, or user, dials into a videoconferencing system, their call is generally connected to the nearest videoconferencing server (or node). This may be the geographically nearest node to the user's videoconference equipment, or it may be the nearest node in terms of network latency.

The decision on which node to connect an incoming call to may also be based on load balancing. For instance, a call routing system that can place a call on one of several conferencing servers might choose to place new calls on the servers according to a "round robin" scheme whereby (for instance in the case of a 2 server system) the first call might be placed on box 1, the second on box 2, the third call on box 1, and so on.

BRIEF DESCRIPTION OF THE DRAWINGS

Embodiments will now be described, by way of example only and with reference to the accompanying drawings, in which:

FIG. 7B illustrates an alternative exemplary flow of the message flow for adding an incoming call to a video conference using the third approach.

DESCRIPTION OF EXAMPLE EMBODIMENTS

Overview

Figure 1:
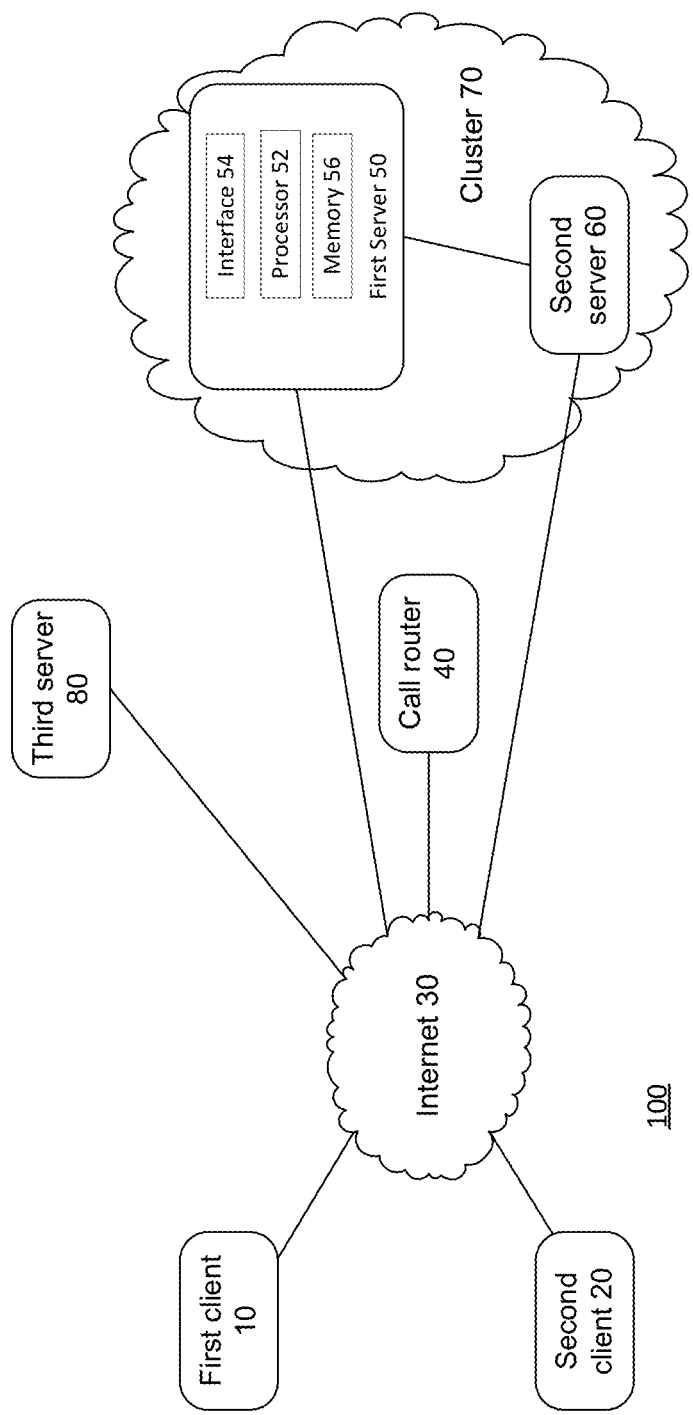
FIG. 1 illustrates an exemplary view of a videoconferencing system.

There is described herein a method for adding a call from a second client to a videoconference; wherein a call from at least a first client is connected to the videoconference, the call from the first client comprising first call control data and first call media data; wherein the call from the second client comprises second call control data and second call media data; and wherein a first node in a videoconferencing network handles the first call media data; the method comprising: handling the second call control data at a second node of the videoconferencing network; determining whether at least one criterion is satisfied; and in the event that at least one criterion is satisfied, diverting the second call media data to the first node of the videoconferencing network.

By diverting (at least) the call media data for the incoming call to a first node/conferencing server upon determining that a certain criterion is satisfied, the distribution of the media handled for calls on the same videoconference can be reduced and the videoconferencing system can work more efficiently, irrespective of the initial placement of the incoming call.

EXAMPLE EMBODIMENTS

The round robin scheme discussed above often gives little or no consideration to the advantage of having calls for the same conference placed together, and so it may end up that there is a lot more "distribution" of calls for the same conference across multiple boxes than there needs to be.

There are a variety of possible approaches to improving the efficiency of handling videoconference calls split across multiple nodes or servers in a videoconferencing network.

At one level, extra intelligence can be added to the call routing system in order that calls for the same conference are grouped together on the same conferencing device or server. This can make the call routing system more complex, and there are many cases where this is not possible, for instance when all calls are initially made to what is effectively a switchboard number and the caller is then required to enter the identifying number for the conference they wish to join. In such a case the call routing system does not know the ultimate destination of the call at the time it needs to make a choice as to where to place it. Another reason why it may not be possible to accomplish balancing is that multiple URIs (Uniform Resource Identifiers) might map to the same conference, or the call routing system has fixed operating modes and no changes can be made to its call routing algorithms.

For the cases where the call routing system can direct calls onto multiple conferencing servers, the inventors have developed methods for at least the media for those calls to be placed efficiently, irrespective of the distribution of incoming calls to the videoconference or the initial placement of the calls by the call routing system. According the present disclosure, it has been found that it is desirable for efficiency reasons to keep media streams for participants in the same conference located close together in terms of being housed on the same physical conferencing unit. In some cases this involves attempting to keep the media for calls in the same conference on the same box or server (node, or other unit that handles videoconference calls).

In some of the approaches described below, the individual servers (to which calls are directed) may be grouped or "clustered" together so that each server can communicate with the others in its group and exchange information on, for instance, which conferences it is currently hosting participants for, and its overall load. Via this communication between conferencing servers, it may be possible to determine a desired/"ideal" location for the call's media. In some embodiments this may only be possible when the conference that the call is to join is known. In some cases the dialed URI will indicate the conference to join, whereas in others the call may have to be connected for a while before the conference is known (for instance if the user has to enter the ID of the conference to be joined).

Another aspect of this is the decision around when a new destination conferencing server is chosen for the call. In some cases, the ideal location can be chosen at the very start of the call, whereas in other cases it will be necessary to wait until after a conference ID/PIN (personal identification number) has been entered.

For PIN entry cases, it may be desirable to put enough intelligence into the call handover mechanism chosen to ensure that, for instance, if the PIN has been entered while connected to the first server or node, there is no need to re-enter the PIN if/when the call is moved to a new server/node (e.g. for approaches 2 and 3 described below).

FIG. 1 shows an exemplary view of a videoconferencing system 100. The system 100 includes a first client 10 and a second client 20. The first and second client 10, 20 may be for example, client devices such as mobile telephones, tablets or personal computers. The first and second clients are connected to a Wide Area Network (WAN), such as the Internet 30.

The system 100 also comprises a call router 40 in communication with the Internet 30. The call router 40 handles incoming calls to videoconferences and can ensure the incoming calls are directed to the correct servers.

A first server 50, second server 60 and third server 80 are connected to the Internet 30. These servers 50, 60, 80 are capable of handling calls from clients in a videoconference. The first server 50 and the second server 60 form part of a cluster 70. This cluster 70 may be formed based on the geographical and/or network proximity of the servers. E.g. the first server 50 and second server 60 may be placed in the same cluster 70 because they are geographically close to each other and/or because they are in similar areas of the videoconferencing network. The cluster 70 may be formed so that each server can communicate with the other servers in the cluster and exchange information on, for instance, which conferences it is currently hosting participants for, and its overall load. The third server 80 is not part of the cluster 70, so it may not be able to communicate such information directly with the first server 50 and second server 60.

As shown in FIG. 1, the first server 50 includes a processor 52, an interface 54 and memory 56. The processor 52 may be a microprocessor or microcontroller (or multiple instances of such) and executes software instructions stored/encoded in memory 56 to perform tasks such as handling call control data and call media data for clients connected to a videoconference. The interface 54 may be a network interface card (or multiple instances of such) that is used for communicating clients and for communicating with other videoconferencing nodes in a videoconferencing network. The memory 56 may be read only memory (ROM), random access memory (RAM), magnetic disk storage media devices, optical storage media devices, flash memory devices, electrical, optical, or other physical/tangible memory storage devices. Thus, in general, the memory 56 may comprise one or more tangible (non-transitory) computer readable storage media (e.g., a memory device) encoded with software comprising computer executable instructions and when the software is executed (by the processor 52) the processor 52 is operable to perform the operations described herein on behalf of the first server 50.

The second server 60 may have a similar structure to the first server 50. The servers depicted in FIG. 1 may also be referred to as "nodes".

Figure 2:
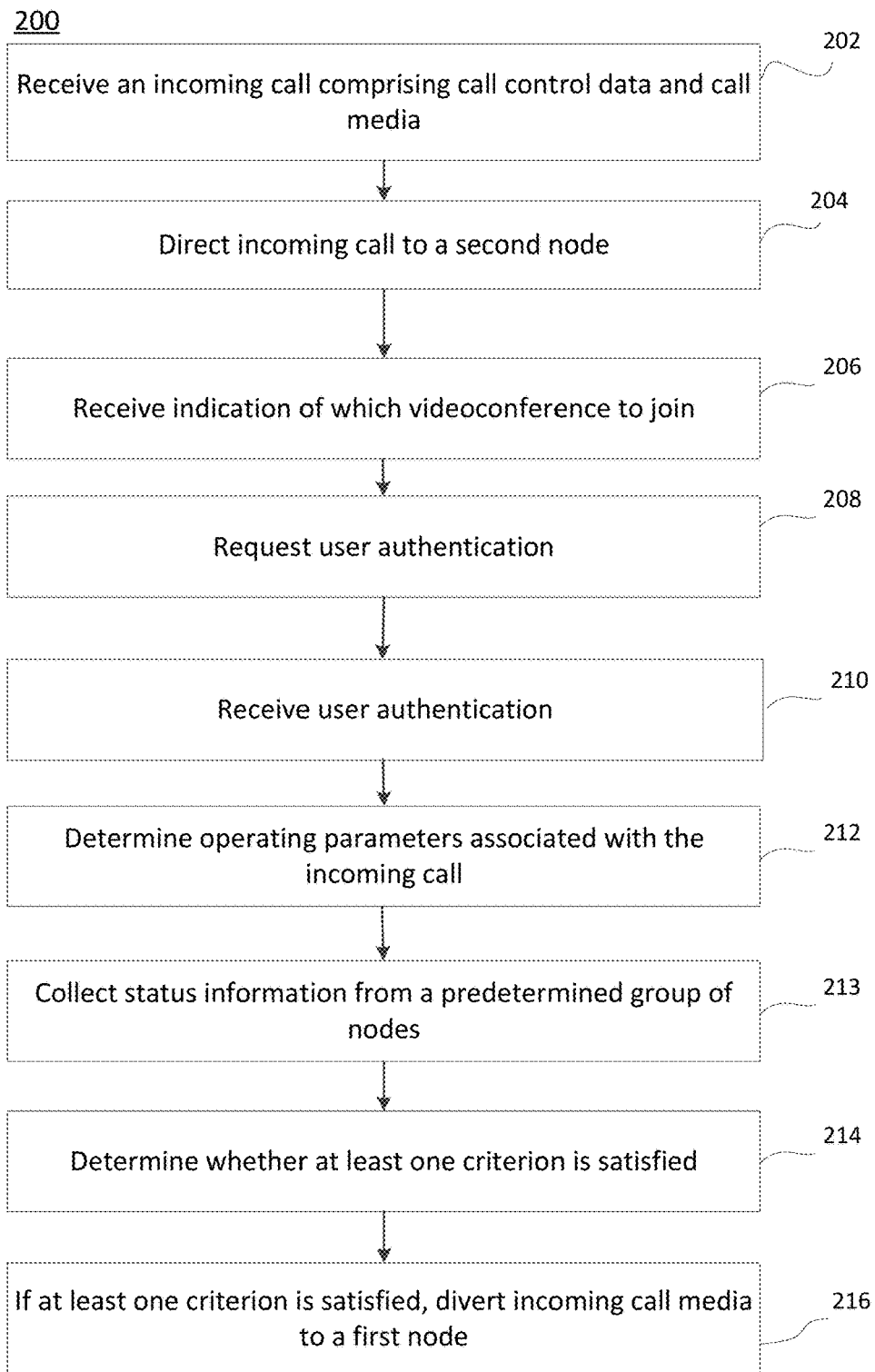
FIG. 2 illustrates an exemplary method for adding an incoming call to a video conference.

FIG. 2 shows an exemplary method 200 for adding an incoming call to a video conference. At step 202 an incoming call is received. The incoming call comprises call control data. In some cases, the incoming call may comprise call media data, for example if the call is initiated via IVR. The incoming call may be received for example at call router 40. Receiving the incoming call may comprise receiving a call request. The incoming call request may specify the videoconferencing network to which it is to be connected. For example, it may specify a domain. This could be the domain of a specific node in the videoconferencing network, or it could be a more generic domain that the call control system is using to distribute calls across multiple nodes, for example it could identify a group or cluster of nodes.

At step 204 the incoming call is directed to a second node. The second node handles the call control data for the incoming call. Where the call also comprises call media data at this stage, the second node may also handle the call media data.

At step 206 an indication of which video conference the incoming call should join is received. This indication may be provided for example by a user entering a conference ID. In some cases the conference ID is unique to the videoconference, for example it may be a globally unique identifier for the conference. In one example, the conference ID may take the form "<conference id>@<domain>", where <conference id> is an identifier of the videoconference that is unique to the videoconference within the videoconferencing network, and <domain> is an identifier that is specific to a single node in the system, or it could be a more generic domain that the call control/videoconferencing system is using to distribute calls across multiple nodes. In some cases a conference maps uniquely to <conference id>, but in other cases there can be a one to many mapping (i.e. one videoconference can have multiple IDs or addresses in this context).

At step 208 user identification is requested. This may involve the user to enter a personal identification number (PIN) and/or to enter whether they intend to share or host the conference or whether they are a guest or participant. For example, these may comprise a PIN and/or a user ID. At step 210 the authentication details entered by the user are received. At step 212 certain operating parameters for the call associated with the incoming call are determined. These may include for example the privileges that the participant making the incoming call may have in the video conference. For example, a host or chair of the conference may be able to add or remove participants, while a regular participant or guest may only be able to add or remove themselves to the video conference.

At step 213 status information may be collected from a group of nodes in the videoconferencing network. This group of nodes may be preconfigured. This group of nodes may have been previously associated with the second node, for example the group of nodes may form a "cluster" or "subcluster" of nodes in the videoconferencing network. The second server may poll the group of nodes to discover their status information. The status information may include, for example, one or more of: the available processing capacity of each node; the number of clients hosted on the node (call media and/or call control data) for the particular videoconference that the second client has requested to join; an indication as to whether the node has capacity to accept call (media and/or control) data for a new call in the video conference and/or for a new call in a new/different video conference.

At step 214 a determination is made as to whether at least one criterion is satisfied. This criterion may be based on the status information collected at step 213, for example, the number or proportion of calls in the video conferencing network that are handled by each server in the video conferencing network (or each server in the group of nodes in the videoconferencing network). It may for example be preferable to group the media for as many calls as possible in the video conference on the same server.

Where there are multiple other nodes in the videoconferencing network that would be available to handle the call media for the second client (e.g. the nodes each have enough processing capacity and currently handle the call media data and/or call control data for the same number or proportion of other clients in the same videoconference), the nodes may be ranked according to another criteria. For example, in some embodiments a per-conference deterministic order for the nodes is chosen. Such an order may be the same regardless of which node in the group is currently handling the second server's call. All the available servers may be arranged into an ordered list (e.g. based on node ID) and then that list can be sorted based on a value derived from the conference ID. This means that for a given video conference, all servers can determine the same priority order for nodes accepting the media for a new call. If the highest priority node is already currently handling the call media for at least one call in the conference, and the load on that node does not exceed a given load threshold, then that node will be chosen as the node to which the second call media should be diverted. If the node with the highest priority according to the priority order based on videoconference ID does not have an existing instance of call media for the videoconference but the next priority node does, then that next node will be chosen. Due to using the same priority ranking method based on the videoconference, all servers looking to redirect call media for an incoming call in the same videoconference will select the same node to which the call media data should be diverted, up until the point that the preferred server's loading exceeds a threshold, above which that server indicates in its responses that it is unable to accept new call media data and/or call control data.

At step 216 if at least one of the criterion is satisfied, the media from the incoming call is diverted to a first node. Diverting the incoming call media data to a first node may also comprise informing the first node of the operating parameters associated with the incoming call, such as user authentication and authorisation of the user as obtained in steps 210 and 212. This means that the call can be set up in its final stage on the first server without requiring further authentication details to be entered by the participant. In cases where the call media data was previously handled by the second node, the handling of the call media data is transferred from the second node to the first node. In cases where there is initially no call media for the second incoming call, such that no call media data exists at the time the call media is diverted to the first node, the first handling of call media data for the call is performed at the first node.

When the first incoming call for a particular videoconference is received (such that no other nodes are hosting calls for clients in the conference), the call media for the incoming call may still be diverted to another node. If one or more servers in the group are prepared to accept new calls for the new conference, then one of those nodes may be chosen for the new call. The priority order of nodes may be determined in the same way as before described above, by creating an ordered list based on the videoconference ID. Rehoming even the first call (or at least the first call's call media) for a new conference may allow multiple simultaneous calls (or at least the call media data for those calls) for the same conference to be placed on the same node, even if the calls are initially placed on different initial servers (none of which may, at the time, have an instance of the conference currently running).

Figure 3A:
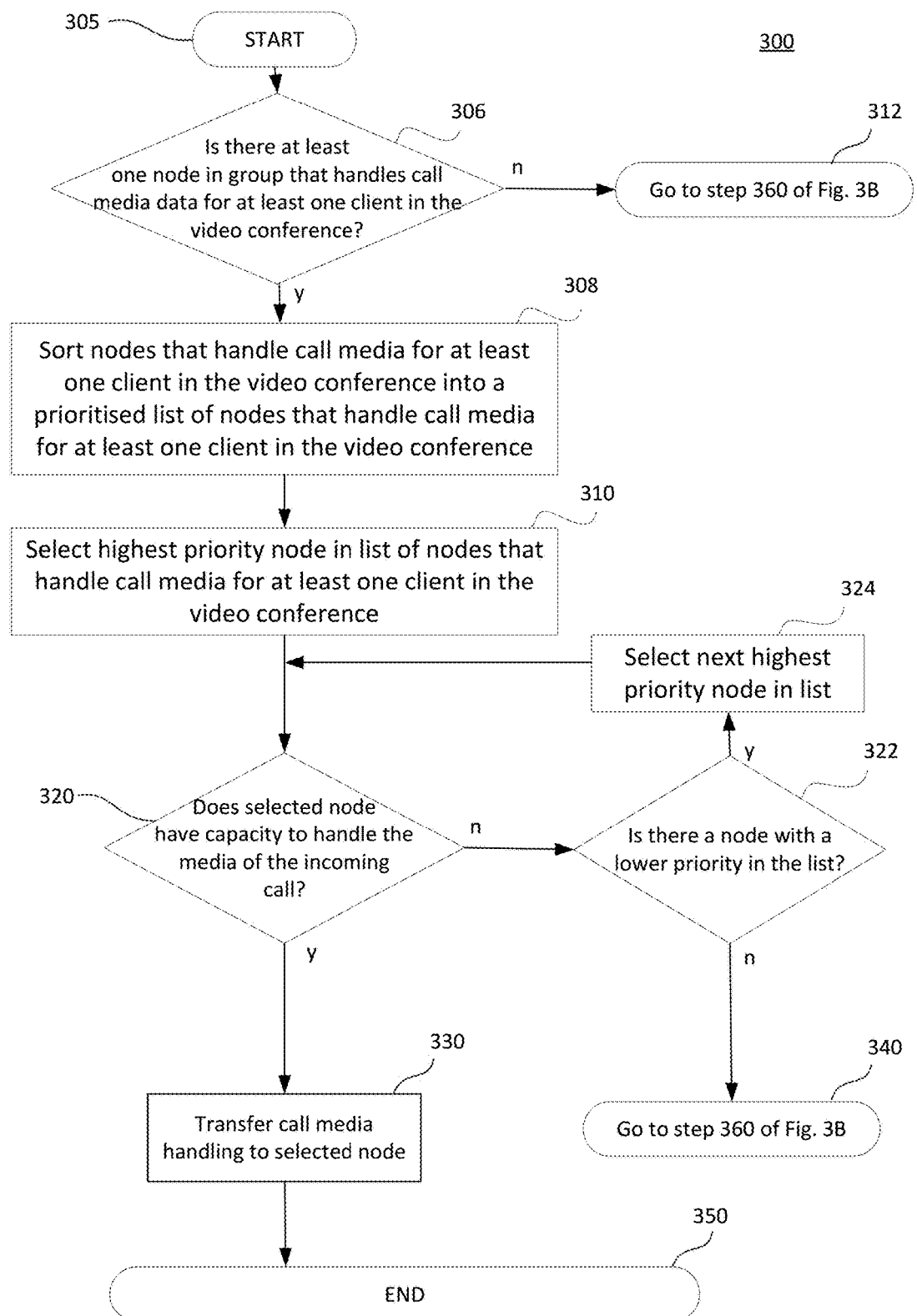
FIG. 3A shows a flow diagram illustrating an exemplary method for determining whether at least one criterion is satisfied.

FIG. 3A shows an exemplary flow diagram of a method 300 for determining whether at least one criterion is satisfied. The step 214 of method 200 may comprise some or all of the steps of method 300. The flow diagram starts at step 305.

At step 306 a determination is made as to whether there is at least one node in a predetermined group of nodes that handles call media for at least once client in the video conference. The group may for example be a grouping based on proximity of servers. That proximity may be geographical for example, servers in the same building or at the same site, or even in the same country or geographical region may be grouped together. Alternatively, proximity may be based on how close the servers are in the network (for example the number of hops between the servers). For example, if there are communication paths between servers it may be the second client can only set up communications with servers in a particular group. For example, the client may only be able to reach servers in a certain geographical group. This group may be a predetermined group of nodes associated with the second node (i.e. the node which is currently handling the call control data for the incoming call from the second client). Alternatively, or additionally, the group of nodes may be associated with the second client. If there is at least one node in the group that handles call media data for at least one client in the video conference, the method progresses to step 308.

The determination at step 306 whether there is at least one node in a predetermined group of nodes that handles call media for at least once client in the video conference may be based on the status information collected from a predetermined group of nodes associated with the second node at step 213 of method 200. At step 308 nodes in the group that handle call media for at least one client in the video conference are sorted into a prioritised list of nodes. This prioritised list of nodes may be based on the video conference that the second client has requested to join at step 206. In one example, the nodes are sorted into a list based on a node identifier for each node, such as a GUID associated with the node, or an IP address of the node. This list is then ordered, or shuffled, based on a value derived from a video conference identifier.

At step 310 the highest priority node in the list of nodes that handle call media for at least one client in the video conference is selected for consideration.

At step 320 a determination is made as to whether that selected node has capacity to handle the call media data of the incoming call. If that node has capacity then the method progresses to step 330 and call media data handling for the incoming call from the second client is transferred to that node. This may be accomplished by diverting the incoming call media to the first node as set out in step 216 of FIG. 2. This may for example use the method as described in any of FIGS. 4 to 7 below. The method then ends at step 350.

Figure 3B:
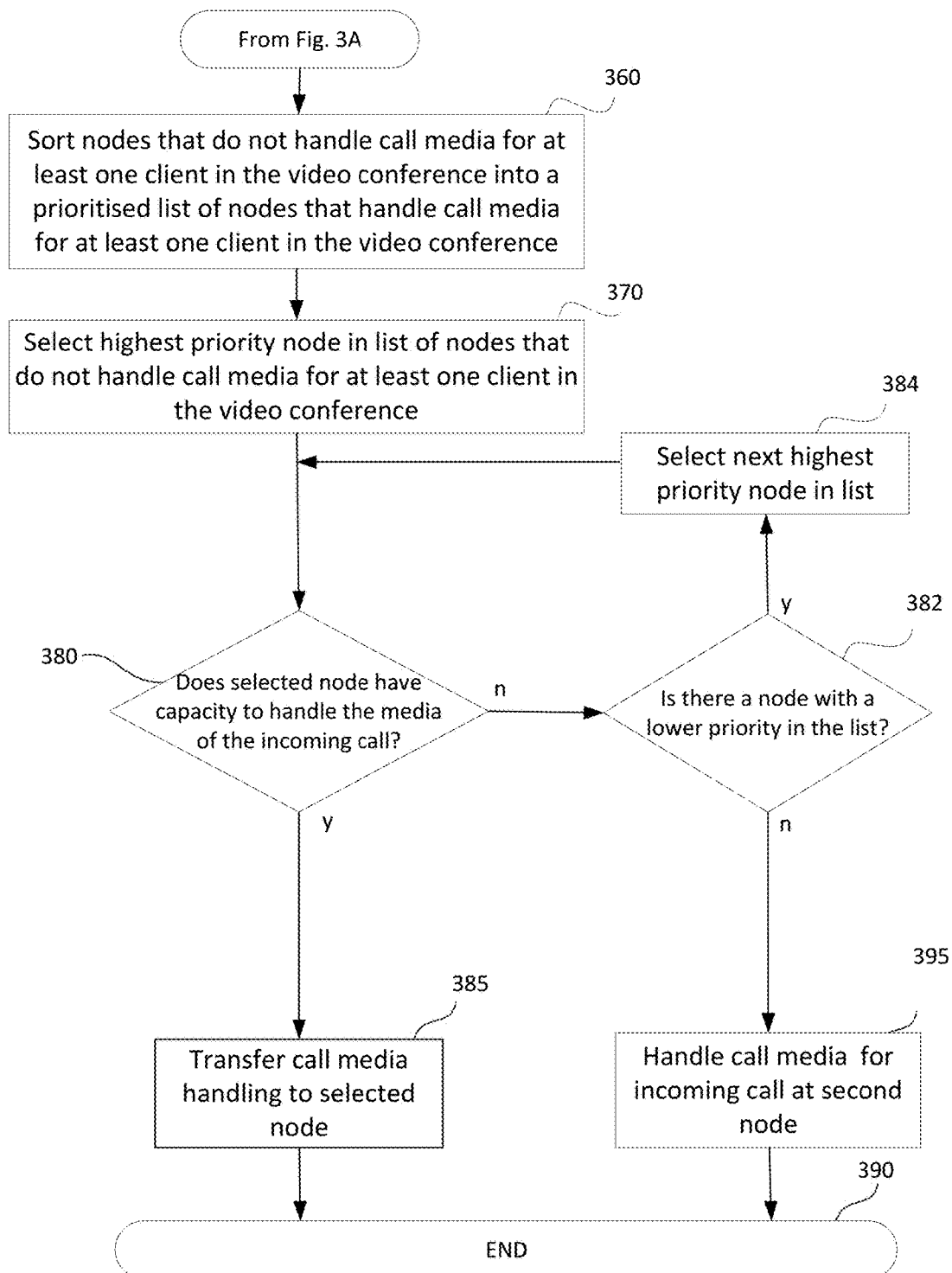
FIG. 3B shows a flow diagram illustrating a continuation of the method shown in FIG. 3A.

If at step 306 it was determined that no other nodes in the group currently handle call media for at least one client in the video conference then the method progresses to step 360 of FIG. 3B, as shown by step 312 in the diagram of FIG. 3A.

If at step 320 it is determined that the highest priority node in the list of nodes that handle call media for at least one client in the video conference does not have capacity to handle the media of the incoming call then the method progresses to step 322. At step 322 it is determined whether there is at least one node with a lower priority than that of the currently selected node in the list of nodes that handle call media for at least one client in the video conference. If there is a lower priority node then the method progresses to step 324.

At step 324 the next highest priority node in the list is selected for consideration. The method then returns to step 320 and it is determined whether the next highest priority node has capacity to handle the media of the incoming call. If the next highest priority node does have capacity to handle the media of the incoming call, then at step 330 call media handling for the incoming call is transferred to the selected node e.g. in this case, the node with the next highest priority in the list.

The method continues until either a node with capacity to handle the call media for the second client has been found, or until it is determined at step 322 that there is no lower priority node in the list. In that case, the method progresses to step 360 of FIG. 3B, as shown by step 340 of FIG. 3A.

The determination at step 320 as to whether the selected node has capacity to handle the media of the incoming call may be based on the status information collected from a predetermined group of nodes at step 213 of method 200.

FIG. 3B shows a continuation of the exemplary method 300 started in FIG. 3A. The method 300 progresses to the steps shown in FIG. 3B if either there are no nodes in the video conference group that currently handle call media for another client in the video conference or if none of the nodes in the group that do handle call media for clients in the video conference have capacity to handle call media for the incoming call.

At step 360 nodes that do not handle call media for at least one client in the video conference are ranked according to a priority measure into a prioritised list of nodes. As before at step 308, this prioritised list may be based on the video conference that the second client is intending to join. The prioritised list may also or alternatively be based on the identification of the node and/or may be randomly generated.

At step 370 the highest priority node in the list of nodes that do not currently handle call media for at least one client in the video conference is selected.

At step 380 a determination is made as to whether the selected node has capacity to handle the media of the incoming call. If the highest priority node does have the capacity to handle the media of the incoming call, the method progresses to step 385, and the call media is transferred to the selected node. This may for example use the method as described in any of FIGS. 4 to 7 below. The method then ends at step 390.

However if at step 380 it is determined that the selected node does not have capacity to handle the incoming call media then the method progresses to step 382. At step 382 it is determined whether there is a node with a lower priority in the list. If there is another node in the list then the method progresses to step 384. At step 384 the next highest priority node in the list is selected. The method then progresses back to step 380 but instead of the highest priority node, the next highest priority node is considered.

If at step 382 it is determined that there is no node with a lower priority in the list then the method progresses to step 395 and the call media for the second client is handled at the second node. This may comprise beginning to handle the second client call media at the second node (if previously there wasn't any call media data for the second client call, e.g. if the media stream had not yet begun), or it may comprise continuing to handle the second client call media at the second node (e.g. if the second client call media data was already being handled at the second node). The method then ends at step 390.

In some embodiments, the step of sorting nodes into a prioritised list (e.g. as described steps 308 and 360) may be performed before determining 306 whether there is a node in the group that handles call media data for at least one client in the videoconference. Thus a prioritised list of nodes may be generated from all nodes in the group. The next step may involve only the nodes that already handle call media data for at least one client in the video conference being selected from that prioritised list in order to determine whether those nodes have capacity to handle the call media for the incoming call.

In some embodiments, the determination of whether at least one criterion is satisfied depends on the expected complexity of the call. For example, the videoconference may have been set up to include a certain number of users, or a certain number of clients may have been sent invitations to the videoconference. Thus the criteria for directing the call media to a first server may depend on the first server having capacity to handle call media for the expected number of clients in the videoconference, or for at least a predetermined proportion of the expected number of clients in the videoconference.

Approach 1

The first approach for diverting the call media data described herein is for the call control functions to stay on the server on which they are first placed and for the internal message exchange between conferencing servers to be responsible for ensuring that only the media part of the call is handled at the most appropriate server. This may use, for example, Session Initiation Protocol (SIP) call mechanisms to tell the remote party (e.g. the client calling in) to send its media to potentially a different location from the termination point/server of the control connection. Logic in the conferencing server software may take care of handling the control and media traffic being homed on potentially different conferencing server units.

Figure 4:
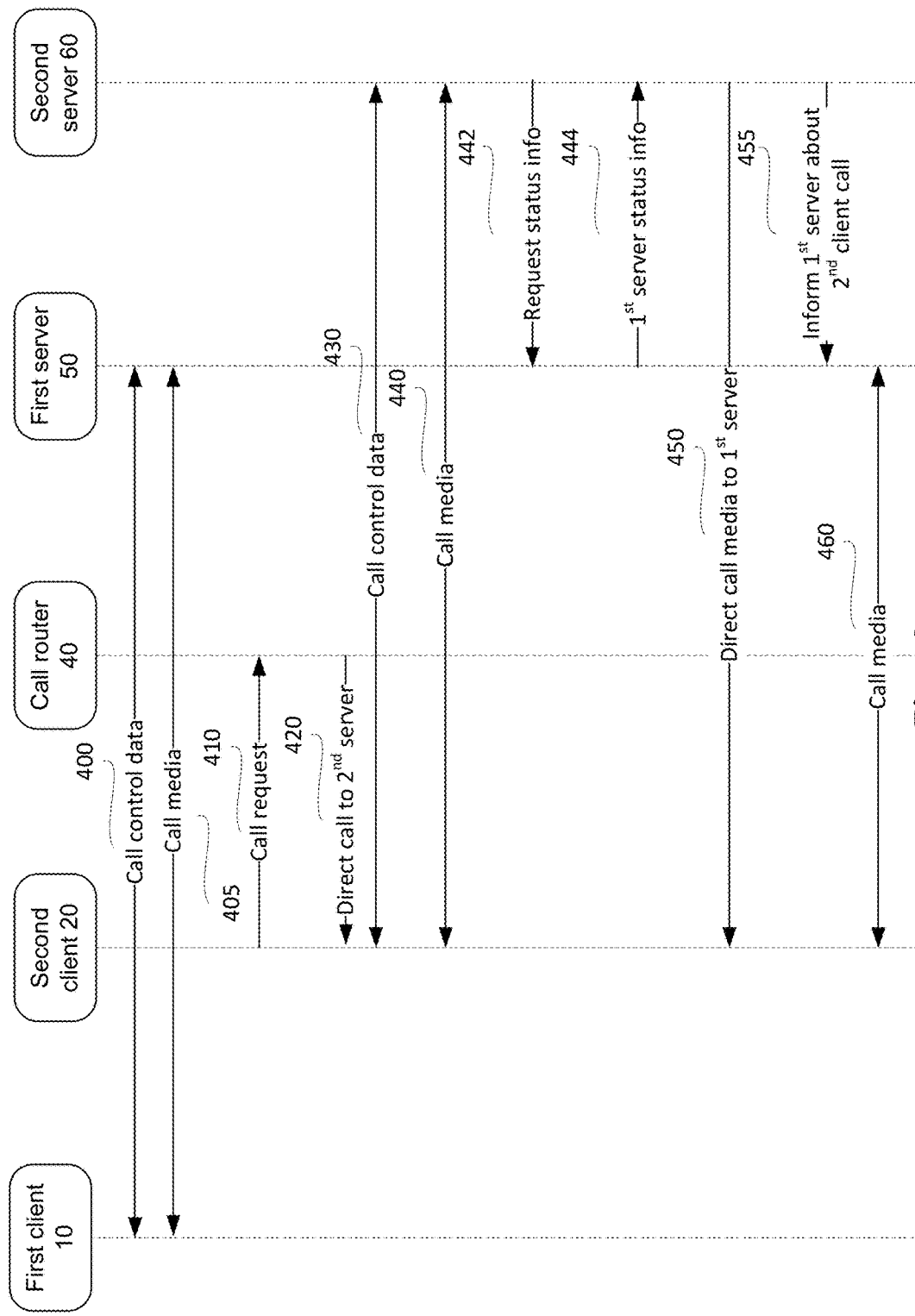
FIG. 4 illustrates an exemplary message flow for adding an incoming call to a video conference according to a first approach.

FIG. 4 shows an exemplary message flow for adding an incoming call to a video conference using this first approach. Initially the first client 10 is sending and receiving its call control data 400 and its call media data 405 to/from the first server 50. Where there is bidirectional data, the first server 50 may also be sending call control data and/or call media data to the first client 10. The first server 50 is handling call control data and call media data for the first client's connection to the videoconference. In alternative embodiments, the first server 50 may be handling the call media data 405 only for the first client 10, and the call control data 400 for the first client 10 may be handled at another videoconferencing server.

The call router 40 then receives an incoming call request 410 from a second client 20. The incoming call request 410 generally comprises control traffic, such as call control data for the second client 20. The call router 40 directs the incoming call from the second client 20 to a second server 60. This causes the second client 20 to send and receive its call control data to/from the second server 60, shown as message 430.

In some embodiments the call router 40 will send a message 420 to the second client 20 requesting that it sends the call control data directly to the second server 60 (as shown in FIG. 4).

Figure 5:
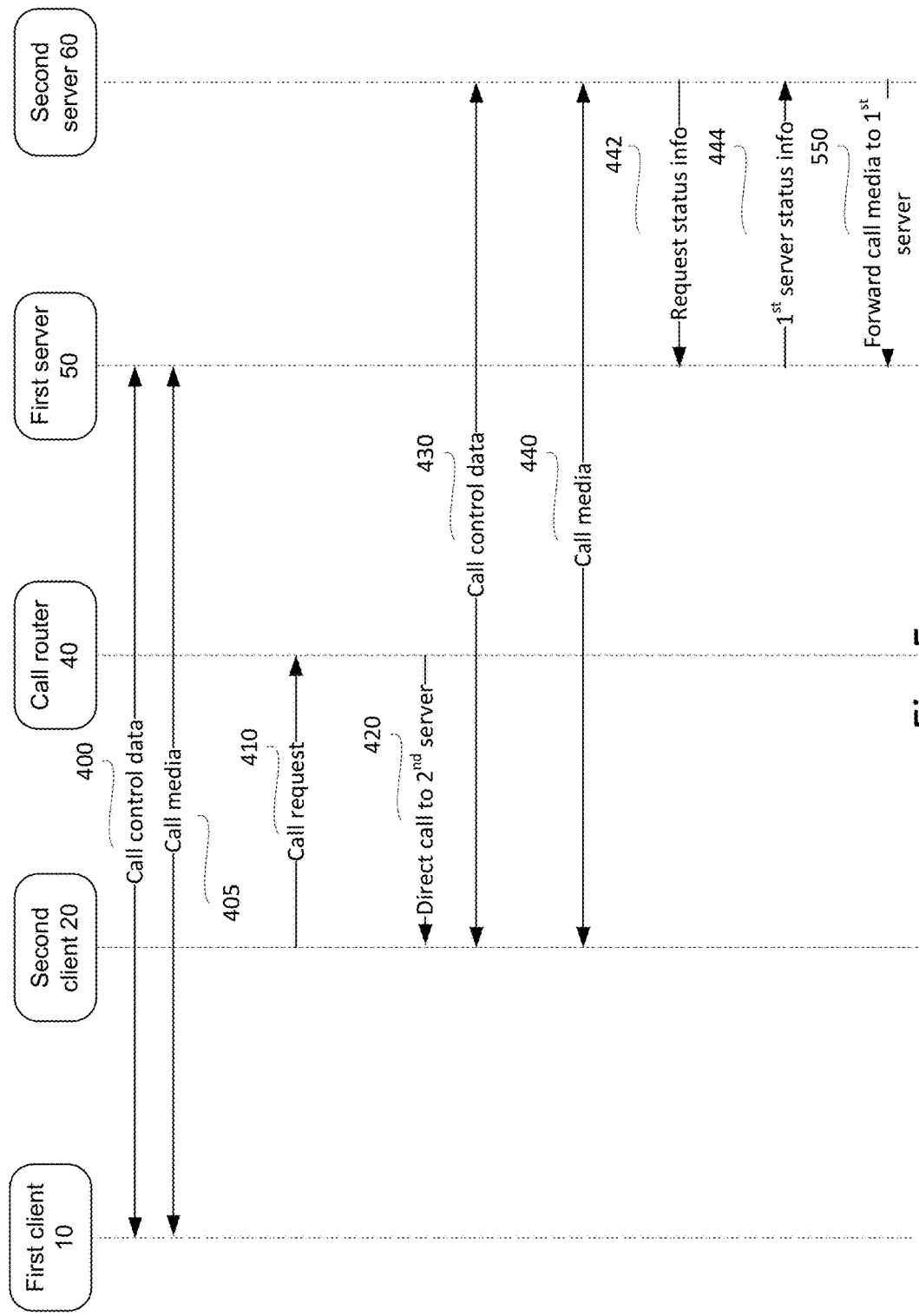
FIG. 5 illustrates an alternative exemplary message flow for adding an incoming call to a video conference using the first approach.
Figure 6A:
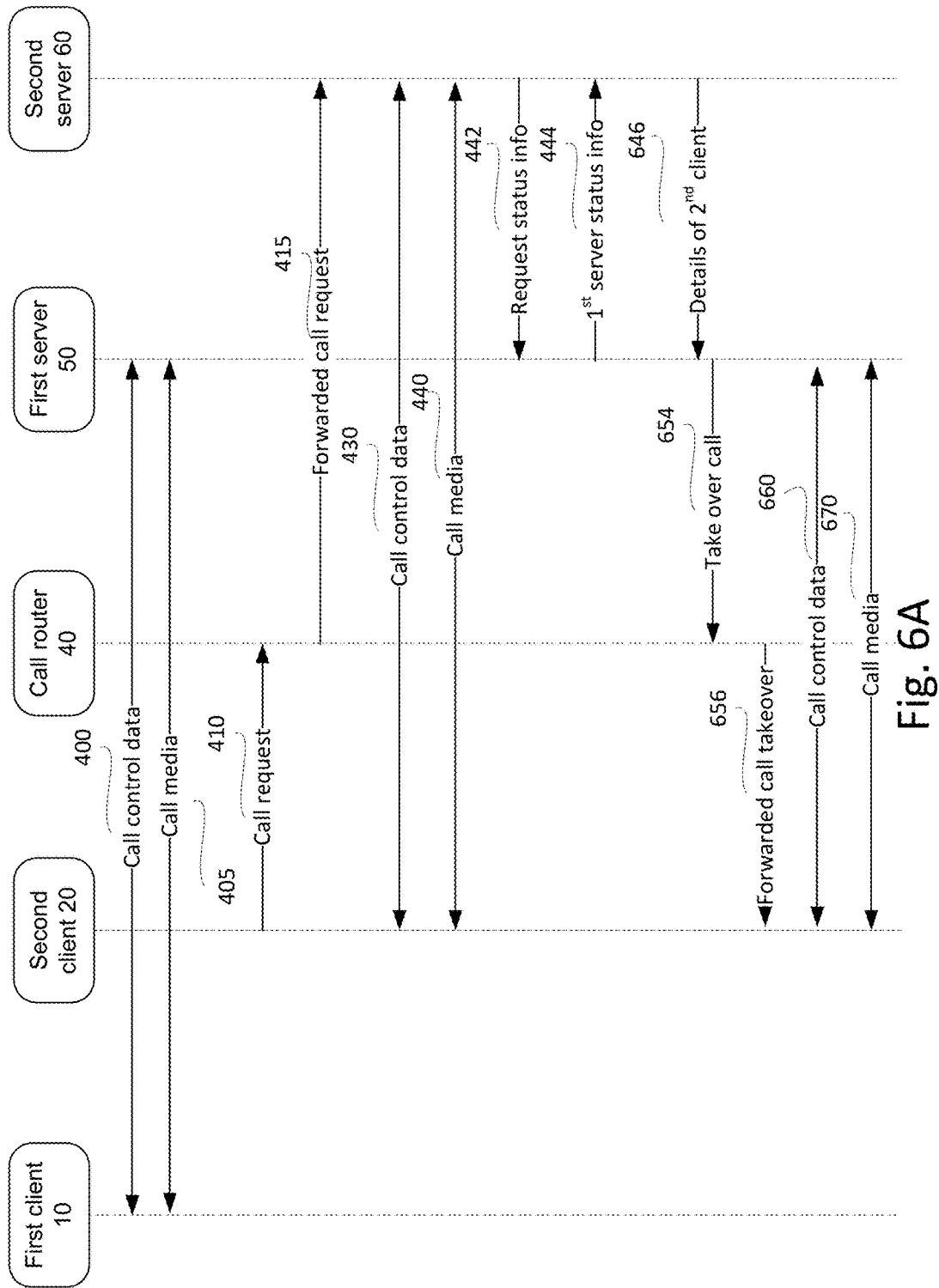
FIG. 6A illustrates an exemplary message flow for adding an incoming call to a video conference according to a second approach.
Figure 7A:
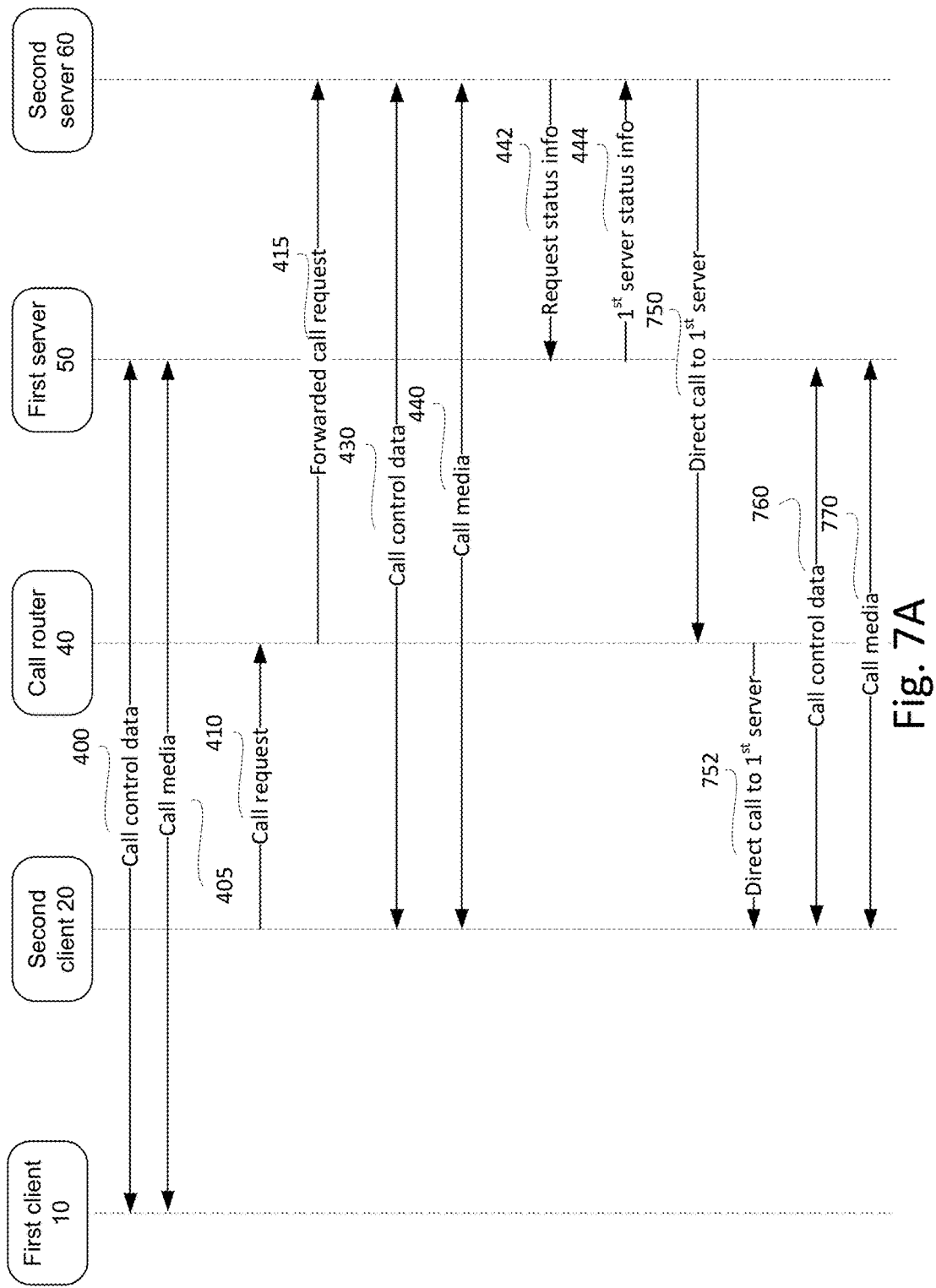
FIG. 7A illustrates an exemplary flow of the message flow for adding an incoming call to a video conference using a third approach.

In some embodiments (not shown) the call router 40 may forward messages, such as the call request and/or call control data packets, from the second client 20 to the second server 60. For an example of this, please see step 415 in FIGS. 6A and 7A;

step 415 of FIGS. 6A and 7A may replace step 420 of FIGS. 4 and 5 in some embodiments.

In this embodiment, the second client 20 also sends and receives its call media data to/from the second server 60, shown as message 440. In some embodiments, there is no call media data available at this stage in the call.

The second server 60 collects status information from the first server 50. In one example, the first server 50 may be in the same group of servers as the second server 60. The second server 60 requests status information from the first server 50 in message 442. The first server 50 sends back information about its status in message 444. This status information may include, for example, one or more of: the number of call media sessions and call control sessions the first server 50 is handling, the number of call media sessions and call control sessions the first server 50 is handling for the particular videoconference the second client 20 has requested to join; the available processing capacity of the first server 50; and an indication of whether the first server 50 has capacity to handle the second client's call media data and/or call control data. The second server 60 may request (and receive) status information from multiple servers, for example from all servers in a group of servers, for example in a cluster or sub cluster of the videoconferencing network.

It is then determined that at least one criterion is satisfied, indicating that the second client's call media data should be passed onto the first server. For example, it may be determined that it is more desirable and/or efficient for the incoming call media data to be handled by the first server 50. This determination may be based on the status information received from the first server in message 444. Optionally, the determination may also be based on status information received from other servers. This determination may only be possible once it is known which video conference the second client wishes to join. In some cases, this will be determined by the dialed URI, but in other cases the call may have been connected for some time before the conference is known, for example if the user has to enter the ID of the conference that is to be joined. In some embodiments, the determination may be made according to method 300, described above.

The second server 60 sends a message 450 to the second client 20, directing the incoming call media data to the first server 50. This message 450 may be included, for example, in the second server's answer to the incoming call. The message 450 to the second client 20 may use media destination addresses such as IP address and port number to identify the first server 50 and/or the second client 20 and/or the second server 60. The message 450 may be an SDP (session description protocol) message sent via SIP from the conferencing server 60 to the second client 20 calling device.

In some embodiments the second server 60 may send a message 455 instructing the first server 50 that it is about to receive the second client's call media data. This message 455 may be sent at the same time as message 450 sent to the second client 20.

In some embodiments the second server 60 may send the message 450 to the call router 40 rather than directly to the second client 20. In some embodiments the call router 40 may forward these messages onto the second client 20.

The second client 20 then sends 460 its call media data to the first server 50. The second client's call control data continues to be handled by the second server 60. The second client 20 may also receive call media data from the first server 50, for example in the case of bidirectional call media. For example bidirectional call media may comprise video streams and/or audio streams recorded by equipment at other clients in the video conference, such as at the first client 10. Logic in the conferencing server software may take care of handling the control and media traffic being homed on different conferencing server units.

In some embodiments (for example if the incoming call request 410 already identified the videoconference the user of the second client is intending to join) the second client's call media may not be sent to the second server 60 at all, and may instead be sent straight to the first server, once it is determined to direct the second client's call media data to the first server 50.

FIG. 5 shows an alternative exemplary message flow for adding an incoming call to a video conference using the first approach. As described in relation to FIG. 4, initially a first client 10 is connected to a video conference. The first client's control data and call media data are handled by a first server 50. An incoming call request 410 from a second client 20 is received by a call router 40. As before, call router 40 sends a message 420 to the second client 20 directing the incoming call to the second server 60. In alternative embodiments, call router 40 may forward the messages, such as the call request, from the second client to the second server. See, for example, message 415 of FIG. 6A, which in some embodiments may replace message 420 of the method of FIG. 5.

The second client 20 sends 430 its call control data to the second server 60. The second client 20 also sends 440 its call media data to the second server 60. The second server 60 requests 442 and receives 444 status information from the first server 50. It is then determined that at least one criterion is satisfied, such that the second client media data should be handled by the first server 50. The second server 60 then forwards 550 the second client's call media data to the first server 50. It may be important to forward this call media as efficiently as possible in order to avoid adding extra latency to the network. The second server 60 may continue to receive and forward the call media data from the second client 20 to the first server 50 for the duration of the videoconference. Thus the second client 20 may not be aware that its call media is being redirected. In this situation, where call media data is bidirectional, the first server 50 may send call media data from other clients in the call to the second client 20 directly, or to the second client 20 via the second server 60. The second server 60 may continue to handle the second client's call control data for the duration of the videoconference.

Approach 2

According to Approach 2, once it has been determined that it is preferable to handle the incoming call media data on a different (new) server, that new server sends a message to direct the incoming call to the new server. Unlike Approach 1, both the control traffic and media traffic is moved to the new conferencing server; the original conferencing server effectively has the call taken away from it at the point that the new server chooses to take it over.

FIG. 6A shows an exemplary message flow for adding an incoming call to a video conference using the Approach 2. As before, the first client 10 is already connected to the video conference and its call media data 405, and optionally call control data 400, are being handled by the first server 50. The call router 40 then receives a call request 410 from the second client 20. This call request 410 may or may not specify which video conference the second client 20 wishes to join. For example, the user may be required to type an identifying number for the conference they wish to join after their call has been connected.

The call router 40 places the incoming call at the second server 60 by forwarding 415 the call request onto the second server 60. This causes the second client 20 to send and/or receive 430 its call control data to/from the second server 60, along with its call media data 440, if available at this stage in the call. In some embodiments, the second client 20 sends and receives its call control data (and call media data) to/from the second server 60 via the call router 40, which forwards data (and media) packets between the second client 20 and the second server 60.

The second server requests 442 and receives 444 status information from the first server 50. This status information may help determine where the second call media data, and optionally the second call control data, should be handled.

Figure 6B:
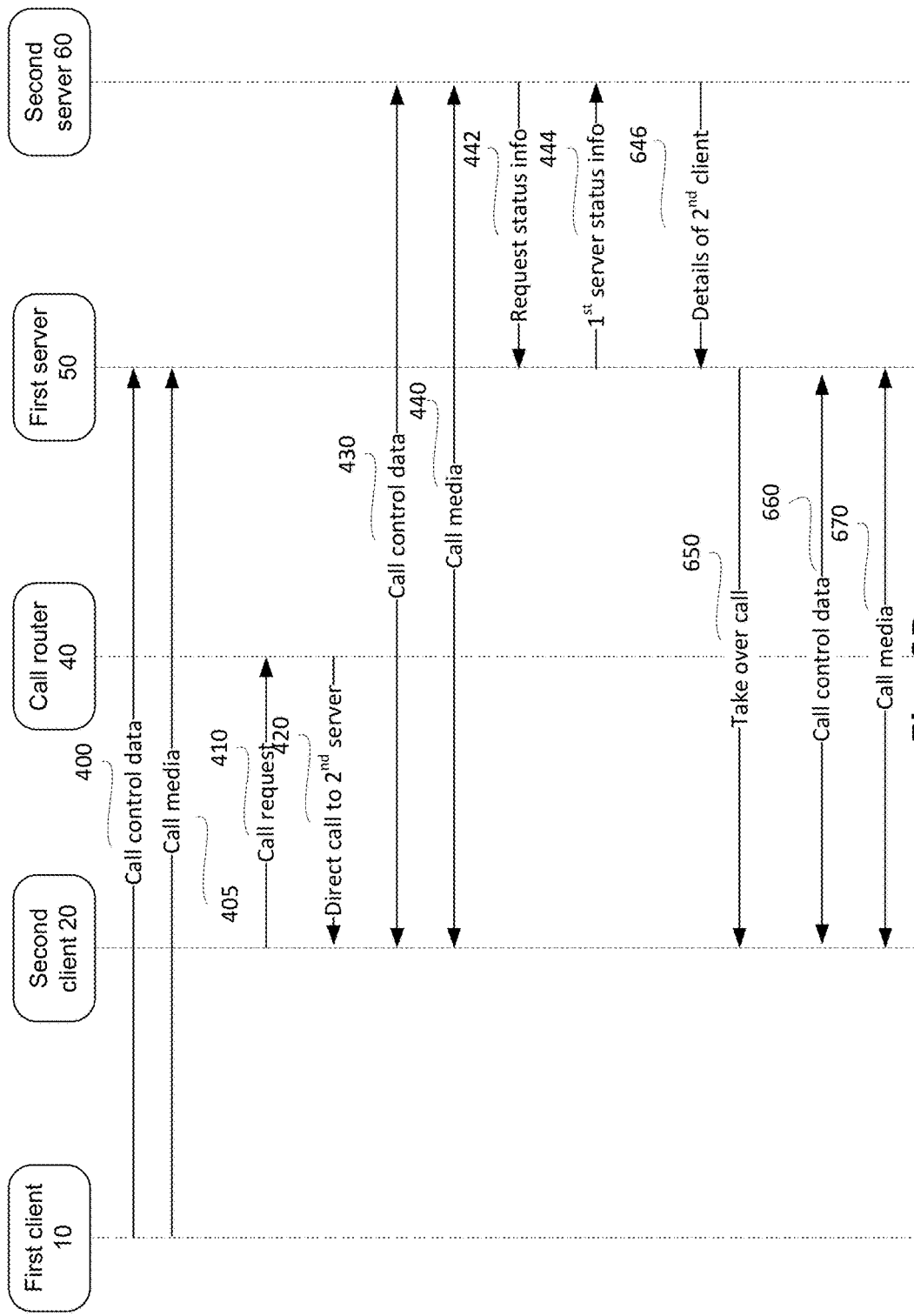
FIG. 6B illustrates an alternative exemplary message flow for adding an incoming call to a video conference according to the second approach.

It is then determined that it is more efficient for the first server 50 to handle the second client's call media data, for example by using a method as described in FIG. 3A. According to the second approach, the second server 60 sends 646 details of the second client 20 and/or of the second client's call to the first server 50. The message 646 to the first server 50 may instruct the first server 50 to take over handling of the call media data and call control data for the second client 20. Following this, the first server 50 sends an invitation 654 to the call router 40 in order to take over the incoming call. For example, the first server 50 may instruct the call router 40 to divert the handling of the second client's call data to the first server 50. The call router 40 may then send a message 656 to the second client 20, instructing the second client 20 to send and receive call media data and call control data to/from the first server 50. For example, the call router 40 may forward 656 the call take-over message from the first server 50 to the second client 20. The second client 20 then sends and receives its call control data 660 and its call media data 670 to/from the first server 50. In this case, both control traffic and media traffic is moved to the first server 50. FIG. 6B shows an alternative implementation of the second approach, in which the call router 40 is removed from the call path after initially placing the second call.

As in FIG. 6A, the first client 10 is already connected to the video conference and its call media data 405, and optionally call control data 400, are being handled by the first server 50. The call router 40 then receives a call request 410 from the second client 20. This call request 410 may or may not specify which video conference the second client 20 wishes to join. For example, the user may be required to type an identifying number for the conference they wish to join after their call has been connected.

The call router 40 places the incoming call at the second server 60 by sending a message 420 to the second client, directing it to send and receive call data to/from the second server 60. This causes the second client 20 to send and receive 430 its call control data to/from the second server 60, along with its call media data 440, if available at this stage in the call.

The second server requests 442 and receives 444 status information from the first server 50. This status information may help determine where the second call media data and second call control data should be handled. The second server 60 may also request and receive status information from other servers in the videoconferencing network.

It is then determined that it is more efficient for the first server 50 to handle the second client's call media data, for example by using a method as described in relation to FIG. 3A. The second server 60 sends 646 details of the second client 20 and/or of the second client's call to the first server 50. The message 646 to the first server 50 may instruct the first server 50 to take over handling of the call media data and call control data for the second client 20. Following this, the first server 50 sends an invitation 650 to the second client 20 in order to take over the incoming call. The second client 20 then sends and receives its call control data 660 and its call media data 670 to/from the first server 50. In this case, handling of both control traffic and media traffic is moved to the first server 50.

In some embodiments, the call router 40 may receive the call media data and call control data for the second client 20 and itself divert the call media to/from the first server 50. In such a case, the second client 20 may be unaware that its call into the videoconference is being handled by the first server 50.

One implementation of Approach 2 is to use the protocol side of the Session Initiation Protocol (SIP) "Replaces" facility (as described in RFC 3891, https://www.ietf.org/rfc/rfc3891.txt). For example, messages 650 and 654 may be "Replaces" messages. The Replaces function was originally intended for telephony features such as call pickup (where a call can be "parked" in one place then picked up from another), but the inventors have been able to repurpose this function to help optimise call distribution. When a new location (i.e. a new "home" conferencing server) for a call's media has been chosen, that new destination may be able to use the "Replaces" mechanism in messages (sent to the call routing device) which enable it to effectively take over the call which was previously placed on the original conferencing server.

Approach 3

Approach 3 is similar to Approach 2 described above, in that it involves moving the entirety of the call (the control signalling and media streams) from the conferencing server on which it was originally placed to a new one. Once it is determined that a new conferencing server should take over the call media data for an incoming call, it is the original conferencing server (to which the client making the call is already connected) that instructs the client to start sending its call control data and call media data to the new conferencing server.

FIG. 7A shows an exemplary flow of the messages for adding an incoming call to a video conference using the third approach. As before, the first client 10 is already connected to a videoconference and the first server 50 handles the first client's call media data 405, and optionally call control data 400. Upon receiving a call request 410 from the second client 20, the call router 40 directs the incoming call to the second server 60 by forwarding 415 the call request to the second server. The second client then sends and receives its call control data 430 and call media data 440 (if call media streams are present at this stage in the call) to/from the second server 60.

The second server requests 442 and receives 444 status information from the first server 50. This status information may help determine where the second call media data and control data should be handled. The second server may also request and receive status information from other servers.

A determination is then made that the call media data for the second client 20 should be diverted to the first server 50. Once the decision to move the call media data of the incoming call to the first server 50 has been made, the second server 60 sends a message 750 to the call router 40 directing that the second client's call media and call control data be handled by the first server 50. The call router 40 may then send a message 752 onto the second client 20, directing the second client 20 to send and receive its call data to/from the first server. The second client 20 then sends and receives call control data 760 and its call media data 770 to the first server 50, which handles the call control and the call media data for the second client's call.

FIG. 7B shows an alternative exemplary flow of messages for adding an incoming call to a videoconference using the third approach, in which the call router 40 does not take part in the message flow after initially placing the call.

As in FIG. 7A, the first client 10 is already connected to a videoconference and the first server 50 handles the first client's call media data 405, and optionally call control data 400. Upon receiving a call request 410 from the second client 20, the call router 40 sends a message to the second client 20 directing the incoming call to the second server 60. The second client 20 then sends and receives its call control data 430 and call media data 440 (if call media streams are present at this stage in the call) to/from the second server 60.

The second server requests 442 and receives 444 status information from the first server 50. This status information may help determine where the second call media should be handled.

A determination is then made that the call media data for the second client 20 should be diverted to the first server 50. Once the decision to move the call media data of the incoming call to the first server 50 has been made, the second server 60 sends a message 754 directing the second client 20 to the first server 50. The second client 20 then sends and receives its call control data 760 and its call media data 770 to/from the first server 50, which handles the call control and the call media data for the second client's call.

One implementation of Approach 3 is to use the SIP "Refer" function (described in RFC 3515, https://www.ietf.org/rfc/rfc3515.txt). For example, the messages 750 and 754 may be "Refer" messages. The original videoconferencing server sends a Refer message, which causes the call routing system to move the incoming call to the specified new destination. Approach 2 may have advantages over Approach 3 because it can also be used in cases where the new destination conferencing server detects that the original one has become inoperative.

Any system feature as described herein may also be provided as a method feature, and vice versa. As used herein, means plus function features may be expressed alternatively in terms of their corresponding structure.

Any feature in one aspect of the disclosure may be applied to other aspects of the disclosure, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects of the disclosure can be implemented and/or supplied and/or used independently.

In summary, there is described herein a method for adding a call from a second client to a videoconference; wherein a call from at least a first client is connected to the videoconference, the call from the first client comprising first call control data and first call media data; wherein the call from the second client comprises second call control data and second call media data; and wherein a first node in a videoconferencing network handles the first call media data; the method comprising: handling the second call control data at a second node of the videoconferencing network; determining whether at least one criterion is satisfied; and in the event that at least one criterion is satisfied, diverting the second call media data to the first node of the videoconferencing network.

By diverting (at least) the call media data for the incoming call to a first node/conferencing server upon determining that a certain criterion is satisfied, the distribution of the media handled for calls on the same videoconference can be reduced and the videoconferencing system can work more efficiently, irrespective of the initial placement of the incoming call.

Pursuant to the disclosure, by concentrating incoming load in this manner, rather than by balancing load across multiple servers as is done in conventional video conferencing systems, an overall increase in efficiency may be achieved.

Advantageously, placement of calls in conventional systems does not need to be changed in order to work with this method as redirection of the call media data may be something that is handled by the video conferencing servers without the client being aware.

Typically each client is a videoconference endpoint.

Call control data may comprise, for example, signalling details and/or dialing details. Call media data may comprise, for example, video and/or audio streams from sound/video recording equipment at the respective endpoints. The call media data will generally comprise encoded video and/or audio streams. In some cases the video and/or audio signals may be compressed. The video and/or audio signals/streams may also or alternatively be encrypted. The call media data may be encoded and decoded at a codec device at each client endpoint.

The first call control data and first call media data may be data that is created at the first client, e.g. dialing details, source address and media (e.g. video and/or sound) streams recorded by video/sound recording equipment located at the first client. The call control data and/or the call media data may be bi-directional data between the videoconferencing network and the client, for example in some embodiments the first call control data and/or first call media data may also be data that is destined for the first client, e.g. source address of other participants in the call and media (e.g. video and/or sound) streams of other participants in the call, which is to be communicated to the first client. Equally, the second call control data and second call media data may be data that originates from the second client, e.g. dialing details, source address and media (e.g. video and/or sound) streams recorded by video/sound recording equipment located at the second client. The call control data and/or the call media data may also be bi-directional data between the videoconferencing network and the client. In some embodiments, the second call control data and/or second call media data may also be data that is destined for the second client, e.g. source address of other participants in the call and media (e.g. video and/or sound) streams of other participants in the call, which is to be communicated to the second client.

In some embodiments, the second call media data may be handled at the second node of the videoconferencing network before the second call media data is diverted to the first node of the videoconferencing network. For example, if the user at the second client initiates the call by dialing into an interactive voice response (IVR) system, media data to/from the second client would be generated before any indication has been given of which videoconference the second client would like to join. Once the user has typed in a conference ID, or otherwise indicated which videoconference is being joined, the system may determine whether to divert the second call media to the first node. In such a case, the second client media data can be handled at the second node initially, until it is diverted.

In other embodiments, the second call media data will not be handled at the second node of the video conferencing network before it is diverted to the first node of the video-conferencing network. This may be because the call with the second client does not comprise any media before the second call media data is diverted. For example, the step of diverting the second client media data may be performed before transmission of the second client media data has started, or before second client media data has been generated. In one example, the at least one criterion is based on one or more of: the number or proportion of clients in the videoconference whose call media data is handled at the first node and/or the second node in order to consolidate call media data from multiple clients in a videoconference at a single node; and an ordered list of a plurality of nodes in the videoconferencing network.

By looking at the proportion of clients whose call media data is handled at each node in the videoconference network it may be possible to group the media for videoconferences more efficiently and/or to reduce the distribution of media handling in the system. Basing the criterion on the number of calls from each videoconference whose media is handled at each server may also be helpful in determining the most efficient placement of the media and whether each server has enough processing capacity to handle the call media data from the incoming call. For example, the method may comprise maximising the number/proportion of clients in the videoconference whose call media data is handled at a single node, up to a load limit for the node.

By looking at an ordered list of a plurality, or group, of nodes in the network, it may be possible to place call media handling at nodes efficiently. The list may be ordered according to a priority criterion for handling call media for an incoming call. For example, the list may be a predetermined list provided to one or more nodes in the videoconference. In other examples, the list may be ordered at the second node, for example it may be ordered according to a predetermined algorithm. Such an ordering may be based on an identifier of the node and/or on an identifier of the videoconference. Where the number/proportion of clients whose call media is handled at each node is also considered, using a prioritised list may allow the system to distinguish between multiple nodes that all currently handle call media for a client in the videoconference.

In one example, the at least one criterion is based on the number or proportion of clients in the video conference whose call media data and/or call control data is handled at each of a plurality of nodes in the videoconferencing network, in one example the plurality of nodes includes at least the first node, the second node and a further node.

In one example, the plurality of nodes consists of (all) nodes in the videoconferencing network which are handling call media data and/or call control data from one or more clients in the video conference. For example, in some cases only the nodes which are handling call media data from one or more clients in the video conference are considered (e.g., the nodes that handle call control data only may not be considered).

In one example, the videoconferencing network is configured such that the second client can communicate with all nodes in the plurality of nodes.

In one example, the first node and the second node are configured as part of the same group of nodes and the videoconferencing network is configured such that the first client can communicate with all nodes in the group.

By grouping the nodes in a videoconferencing network into "clusters" or "subclusters", it is possible to ensure that call media data and/or call control data are only directed to nodes which are accessible by the client. For example, in a worldwide, geographical set up it may be the case that each region can reach the other regions, but endpoint systems (e.g. individual clients) can only reach/communicate with the server(s) in their own region. In this case, nodes in each region would be grouped into a regional cluster, and clients in each region could only access nodes for their local region. Then, the second call media data would only be transferred/diverted to the first node if the first node is in the second client's regional cluster.

In one example, the at least one criterion is based on the number or proportion of clients in the videoconference whose call control data is handled at the first node and/or the second node.

By basing the at least one criterion on a number or proportion of clients in the video conference whose call control data is handled at the first node or the second node, it may be possible to handle the control signals efficiently as well. Basing the criterion on the number of calls from each videoconference whose call control data is handled at each server may also be helpful in determining the most efficient placement of the calls. For example, where two nodes currently handle the call media data from the same number of calls in the conference, the criterion may specify that the call media data for the incoming call from the second client should be diverted to whichever of those two nodes handles call control data for the most number of clients in the videoconference.

The method may comprise maximising the call control data from clients in the videoconference that is handled at a single node, up to a load limit.

In one example, the step of determining whether at least one criterion is satisfied comprises: requesting status information from a group of nodes, the group of nodes including the first node. For example, this status information may include the available processing capacity of each node, the number of calls handled by each node, whether (and how many) each node handles call media data and/or call control data for one or more clients in the video conference.

In one example, the step of determining whether at least one criterion is satisfied comprises: ordering a group of nodes in order of priority for handling call media for a call in the videoconference. By ordering a group of nodes into a prioritised order, it is possible to choose between different nodes which are capable of handling the incoming call media.

In one example, the order is based on an identifier of the videoconference. Thus the order will be the same for any call in the same videoconference, but a different priority order may be identified for clients joining other videoconferences. This may allow call media for each videoconference to be concentrated at the same node, for example for efficiency, but for call media for different conferences to be more evenly distributed between different nodes.

In one example, all nodes in the group of nodes are operable to compute the order consistently. For example, each node may use the same algorithm to compute the ordered list. The algorithm may be based on an identifier of the videoconference. Thus all nodes in the videoconference may reach a consistent determination of the same priority order for which node should handle the call media, and is independent of which node initially handles the incoming call. This may also reduce messages between nodes, such as messages identifying where call media should be placed, and thus reduce network traffic.

Alternatively, one node in the group (or another device in the videoconferencing network, such as a call router) may compute the prioritised order of nodes and send the ordered list to other nodes in the group. Thus all nodes would work from the same list and use the same priority criteria for diverting incoming call media data. For example, the ordered list may be generated on the first instance of a call for a videoconference. The ordered list may be distributed to all nodes in a group of nodes, automatically once it has been generated. Alternatively, the ordered list may be sent to individual nodes following a request from that node to receive the list. For example, the second node may request an ordered list of nodes in the videoconferencing group and then may determine whether at least one criterion is satisfied based on the order of nodes in the list.

In one example, the method further comprises: receiving a request from the second client to join the videoconference, wherein the request includes a unique identifier of the videoconference.

In one example, the at least one criterion is based on a proximity measure.

By basing one of the criteria on a measure of proximity, it may be possible to ensure that network connections between the servers and also between the clients and the servers are optimised according to the way the network has been set up and the geographical locations of the servers and the clients.

In one example, the proximity measure comprises a measure of geographical proximity.

For example, the geographical proximity may take into account the geographical separation between the first and the second node. Alternatively or additionally it may be based on the geographical separation between each client and each node. This may be helpful for reducing the geographic distance that call data has to travel, and therefore decrease load on the network.

In one example, the proximity measure comprises a measure of network proximity.

For example, the network proximity may be determined by network connectivity between one or each of the first and second node and the first client, between one or each of the first and second node and the second client, or the network separation of the first node from the second node. The network proximity may include a measure of the latency (e.g. round trip time) between nodes, or a measure of the number of hops. The network proximity may also be based on grouping of nodes, for example it may be more desirable to place calls for the same videoconference on nodes which are in the same "cluster" or are capable of exchanging information between each other easily.

In one example, the at least one criterion is based on: the total number of calls whose call media data and/or call control data is hosted on the first node and/or the second node; the available processing capacity of the first node and/or the second node; and/or the processing capacity required to support the second call media data. The criterion may additionally be based on the total number of calls whose call media data and/or call control data is hosted by other nodes in the video conferencing network.

Where the total number of media calls hosted or the available processing capacity of each of the nodes is considered, this can help to ensure suitable node balancing between the servers. Taking into account the processing capacity required for the incoming call may also help. For example, media for new incoming calls to a particular video conference may be diverted to the first node until the first node is handling a certain number of calls which is close to the maximum number of calls it is capable of handling, or until the processing capacity of the first node is almost completely used up.

In one example, the method further comprises in the event that the at least one criterion is satisfied, diverting the second call control data to the first node.

In one example, diverting the second call media data, and optionally the second call control data, comprises the first node sending a message to the second client to instruct the second client to send and/or receive the second call media data to/from the first node.

In one example, the message sent from the first node to the second client comprises: a unique identifier for the videoconference; an identifier of the first node; and an identifier of the second client.

In one example, diverting the call media data and/or the call control data to the second node comprises: the second node sending a message to the second client to instruct the second client to send and/or receive second call media data to/from the first node.

In one example, the message sent from the second node to the second client comprises: a unique identifier for the videoconference; an identifier of the first node; and an identifier of the second client.

In one example, the identifier of the second client comprises a Session Initiation Protocol (SIP) To-tag and the identifier of the second node comprises a SIP From-tag.

In one example, the unique identifier for the videoconference comprises a globally unique identifier (GUID). Additionally or alternatively, the unique identifier for the videoconference is associated with the source address of the videoconference host.

In one example, the method further comprises, before handling the second call control data at a second node of the videoconferencing network, the step of: receiving a call request from the second client, the call request comprising the source address of the second client and an identifier of the videoconferencing network.

In one example, the identifier of the videoconferencing network comprises an identifier of an IVR system, such as an identifier that specifies one or more nodes in the videoconferencing network, or an IP address, such as an IPv4 address or an IPv6 address, or a multicast address.

In one example, the method further comprises, before determining whether at least one criterion is satisfied, receiving a request to join the videoconference from the second client, the request to join the videoconference comprising an identifier for the videoconference. Generally the identifier for the videoconference maps uniquely to a conference; in some cases the videoconference identifier may be a many to one mapping (e.g. one videoconference can have multiple identifiers/addresses in this context). In some embodiments the identifier for the videoconference is a new, random and/or unique conference identifier that is constructed to represent the incoming call's participation in the conference (e.g. the call of the second client, as opposed to the participation of other clients, such as the first client, in the conference). The identifier for the videoconference may identify the conference and optionally may identify whether the client has used a chair or guest access method to reach the videoconference). Such a videoconference identifier that is unique to the videoconference and to the incoming call may also include further details, for example it could represent whether a password or PIN (personal identification number) has already been successfully entered by the user at the client in order to authenticate access to the videoconference.

In one example, the request to join the videoconference further comprises a videoconference node identifier associated with one or more nodes in the videoconference network.

In one example, diverting the call media data to the first node comprises sending to the first node a unique identifier for the videoconference and configuration information for the incoming call.

In one example, the configuration information for the call includes an indication of authentication information entered for the call from the second client.

In one example, the authentication information entered is indicative of whether the first client is a chair or guest for the videoconference.

In some embodiments, the method may comprise determining whether at least two criteria are satisfied prior to diverting the second call media data to the first node of the video conferencing network.

In one example, the step of determining whether at least one criterion is present comprises: sorting nodes in a group of nodes into a prioritised list. In determining whether at least one criterion is satisfied, the higher priority nodes may be considered first. If it is not possible to divert the second call media data to higher priority nodes, the next highest node may be considered.

In one example, the ordered list is based on the identifier of the videoconference.

In one example the method further comprises requesting status information from a group of nodes. The status information may comprise the number of participants in the video conference whose call media and/or call control data handled by each node in the group of nodes. Alternatively or additionally the status information may comprise the available processing capacity of each node in the group.

In one example, the method further comprises receiving status information from a group of nodes. The status information may be used in determining whether at least one criterion is satisfied. The group of nodes may include the first node. The group of nodes from which status information is requested and/or received may exclude the second node.

Some or all of the steps of these methods may be performed at the second node in the videoconferencing network. Some or all of the steps of the methods may be performed at a call router. Some of the steps may be performed at the first node.

There is also described herein a videoconference node comprising: a processor for handling call control data and call media data for clients connected to a videoconference; and an interface for communicating with clients and for communicating with other videoconferencing nodes in a videoconferencing network; wherein the node is operable to: receive a call from a second client, the call from the second client comprising at least second call control data; handle the second call control data; determine whether at least one criterion is satisfied; and in the event that at least one criterion is satisfied, divert second call media data to a first node in the videoconferencing network, wherein the first node handles first call media data for a first client connected to the videoconference.

The above embodiments and examples are to be understood as illustrative examples. Further embodiments, aspects or examples are envisaged. It is to be understood that any feature described in relation to any one embodiment, aspect or example may be used alone, or in combination with other features described, and may also be used in combination with one or more features of any other of the embodiments, aspects or examples, or any combination of any other of the embodiments, aspects or examples. Furthermore, equivalents and modifications not described above may also be employed without departing from the scope of the disclosure, which is defined in the accompanying claims.

The invention claimed is:

1. A method for adding a call from a second client to a videoconference;
   wherein a call from at least a first client is connected to the videoconference, the call from the first client comprising first call control data and first call media data;
   wherein the call from the second client comprises second call control data and second call media data; and
   wherein a first node of a plurality of nodes in a videoconferencing network handles the first call media data; the method comprising:
   handling the second call control data at a second node of the plurality of nodes of the videoconferencing network, wherein the second call control data includes user authentication and user authorization information;
   determining, by the second node, whether at least one criterion is satisfied, wherein the at least one criterion is whether the first node has a higher priority compared to a priority of a remaining plurality of nodes, wherein the priority for each respective node is based on an identifier for the videoconference;
   in the event that the at least one criterion is satisfied:
      providing, by the second node, to the first node the user authentication information and the user authorization information included in the second call control data; and
      diverting, by the second node, the second call media data to the first node of the videoconferencing network.

2. A method according to claim 1, wherein the at least one criterion is based on one or more of:
   the number or proportion of clients in the videoconference whose call media data is handled at the first node and/or the second node in order to consolidate call media data from multiple clients in the videoconference at a single node; and
   an ordered list of the plurality of nodes in the videoconferencing network, ordered according to priority for handling call media for an incoming call.

3. A method according to claim 1, wherein the at least one criterion is based on the number or proportion of clients in the videoconference whose call control data is handled at the first node and/or the second node.

4. A method according to claim 1, wherein the at least one criterion is based on the number or proportion of clients in the videoconference whose call media data and/or call control data is handled at each of the plurality of nodes in the videoconferencing network.

5. A method according to claim 1, wherein the step of determining whether the at least one criterion is satisfied comprises:
requesting, by the second node, status information from a group of nodes, the group of nodes including the first node.

6. A method according to claim 1, wherein the step of determining whether the at least one criterion is satisfied comprises:
ordering, by the second node, a group of nodes in order of priority for handling call media for a call in the videoconference.

7. A method according to claim 1, further comprising:
receiving, by the second node, a request from the second client to join the videoconference, wherein the request includes a unique identifier of the videoconference.

8. A method according to claim 1, wherein the at least one criterion is based on a proximity measure.

9. A method according to claim 1, wherein the first node handles the first call control data.

10. A method according to claim 1, wherein the at least one criterion is based on:
a total number of calls whose call media data and/or call control data is hosted on the first node and/or the second node and/or other nodes in a group of nodes;
a available processing capacity of the first node and/or the second node and/or other nodes in a group of nodes; and/or
a processing capacity required to support the second call media data.

11. A method according to claim 1, wherein the first node and the second node are configured as part of a same group of nodes and the videoconferencing network is configured such that the second client can communicate with all nodes in the group.

12. A method according to claim 1, further comprising:
in the event that the at least one criterion is satisfied, diverting, by the second node, the second call control data to the first node.

13. A method according to claim 1, wherein diverting the second call media data comprises the first node sending a message to the second client to instruct the second client to send the second call media data to the first node.

14. A method according to claim 13, wherein the message sent from the first node to the second client comprises:
a unique identifier for the videoconference;
an identifier of the first node; and
an identifier of the second client.

15. A method according to claim 14, wherein the unique identifier for the videoconference comprises a globally unique identifier (GUID) and/or a unique identifier for the videoconference is associated with a source address of a videoconference host.

16. A method according to claim 1, wherein diverting comprises:
the second node sending a message to the second client to instruct the second client to send and/or receive second call media data to/from the first node.

17. A method according to claim 16, wherein the message sent from the second node to the second client comprises:
a unique identifier for the videoconference;
an identifier of the first node; and
an identifier of the second client.

18. A method according to claim 1, wherein the method further comprises, before handling the second call control data at a second node of the videoconferencing network, the step of:
receiving, by the second node, a call request from the second client, the call request comprising a source address of the second client and an identifier of the videoconferencing network.

19. A method according to claim 1, wherein diverting the call media data to the first node comprises sending to the first node a unique identifier for the videoconference and configuration information for an incoming call.

20. A videoconference node comprising:
a processor for handling call control data and call media data for clients connected to a videoconference; and
an interface for communicating with clients and for communicating with other videoconferencing nodes in a videoconferencing network;
wherein the processor is configured to:
receive, via the interface, a call from a second client, the call from the second client comprising at least second call control data, wherein the second call control data includes user authentication and user authorization information;
handle the second call control data;
determine whether at least one criterion is satisfied, wherein the at least one criterion is whether a first node has a higher priority compared to a priority of a remaining plurality of nodes, wherein the priority for each respective node is based on an identifier of the videoconference;
in the event that the at least one criterion is satisfied:
provide to the first node the user authentication information and the user authorization information included in the second call control data; and
divert second call media data to the first node in the videoconferencing network, wherein the first node handles first call media data for a first client connected to the videoconference.

* * * * *